United States Patent Office 3,637,781
Patented Jan. 25, 1972

3,637,781
PROCESS FOR THE PURIFICATION OF MIXTURES OF ORGANOCHLOROSILANES
Andre Bazouin, Luzinay, and Marcel Lefort, Caluire, France, assignors to Rhone-Poulenc S.A., Paris, France
No Drawing. Filed Mar. 13, 1970, Ser. No. 19,507
Claims priority, application France, Mar. 17, 1969, 6907553
Int. Cl. C07f 7/20
U.S. Cl. 260—448.2 E           7 Claims

ABSTRACT OF THE DISCLOSURE

Mixtures of organosilicon compounds containing at least one chlorinated organosilicon compound are separated by adding an aprotic compound, or a precursor thereof, and either water or an alcohol to the mixture and then fractionally distilling the compound containing the smallest number of chlorine atoms bonded to the same silicon atom.

---

The present invention provides a process for the purification of a mixture of organosilicon compounds.

The separation of organosilicon compounds is of very great industrial interest since known processes for synthesising, for example, organochlorosilanes lead to mixtures of monofunctional, difunctional or trifunctional derivatives. For subsequent use, it is necessary carefully to separate the constituents of the mixture. For example, in order to obtain a diorganopolysiloxane oil of high viscosity it is essential to carry out the hydrolysis and the polymerisation of organodichlorosilane precursors which are practically devoid of organotrichlorosilanes because the latter engage in crosslinking reactions between the polysiloxane chains.

Organochlorosilanes are generally separated by physical means, usually by fractional distillation with columns of very high efficiency. This process (which is expensive) is all the more difficult to apply when dealing with mixtures of organochlorosilanes of low volatility and with very similar boiling points.

Various chemical processes have been used to achieve this separation. In French Pat. 1,141,735 it has been proposed to add formamide or dimethylformamide to the mixture of organochlorosilanes to form solid complexes with the trichlorosilanes and thereafter to separate the dichlorosilanes by distillation. This method requires the use of large amounts of formamide and cannot therefore advantageously be carried out on mixtures containing high concentrations of organotrichlorosilane. Moreover, the complexes cannot be decomposed even at the boiling point of dimethylformamide which severely hampers recovery and reuse of the formamide.

Also, in French Pat. 1,466,546 it has been proposed to add a tris-(alkylamino)phosphine oxide to the mixture of organochlorosilanes to form solid complexes with the trichlorosilanes which makes it possible to isolate the dichlorosilane while the trichlorosilane may subsequently be regenerated by decomposition of the complex. However, this method requires working at a low temperature and using molar amounts of phosphine oxide greater than the molar amount of trichlorinated derivative.

Furthermore, in French Pat. 1,240,180, it has been proposed that the trichlorinated or tetrachlorinated derivatives may be removed from a mixture of organochlorosilanes by adding phosphoric acid. The dichlorosilane is subsequently obtained pure by distillation. This process requires the use of a molar amount of phosphoric acid ten times greater than that of the trichlorosilanes of tetrachlorosilanes. As a result, at the end of the reaction the dichlorosilane also reacts with the phosphoric acid. Because of this, the amount of dichlorosilane recovered is reduced.

We have now found a new process for the purification of mixtures of organosilicon compounds of very similar boiling points which consists in isolating from a mixture (A, B) containing chlorinated organosilicon compounds the compound containing the smallest number of chlorine atoms bonded to the same silicon atom (hereinafter called compound A), it being possible for this number of chlorine atoms to be zero, while the most highly chlorinated derivatives (hereinafter called compounds B) are converted into siloxanes or alkoxysilanes of higher boiling points.

According to the present invention, there is provided a process for the purification of a mixture of organosilicon compounds containing at least one chlorinated organosilicon compound which comprises (1) adding to the mixture, together or successively: (a) an aprotic compound or precursor thereof and (b) a compound of formula ROH wherein R represents hydrogen, alkyl, cycloalkyl or aralkyl, the component (a) being used in a proportion of 0.0001 to 0.01 mol per organosilicon group possessing the largest number of chlorine atoms bonded to the same silicon atom and the component (b), being used in an amount of at least one mol per organosilicon group possessing the largest number of chlorine atoms bonded to the same silicon atom, and (2) isolating, by fractional distillation, the organosilicon derivative containing the smallest number of chlorine atoms bonded to the same silicon atom, it being possible for this number to be zero.

Such mixtures (A, B) are easily obtained by distillation of crude mixtures. For example, a fractional distillation of crude mixtures containing organochlorosilanes makes it possible on the one hand to recover the constituents which can be easily isolated in the pure state and on the other hand to recover one or more fractions comprising organochlorosilanes of very similar boiling points.

Mixtures (A, B) consisting of organosilicon compounds of very similar boiling points may be derived by the partial or complete replacement by methyl or ethyl radicals of chlorine atoms bonded to a silicon atom. The process according to the invention is applicable to such compounds regardless of the number of silicon atoms contained in the molecule.

In particular, the invention makes it possible to purify a mixture (A, B) consisting of organosilanes of the general formula:

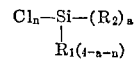

in which $R_1$ represents methyl or ethyl; $R_2$ represents alkyl or alkenyl containing 1 to 6 carbon atoms, cycloalkyl or cycloalkenyl containing 4 to 6 ring carbon atoms, aryl, aralkyl (such as phenylalkyl) or alkaryl (such as alkylphenyl), which radical may also contain groups which are inert with respect to the compounds used for the purification (for example, cyano or chloro, the latter not being bonded to a silicon atom), $a$ represents zero or an integer from 1 to 3; and $n$ represents zero or an integer from 1 to 4 and the sum ($a+n$) does not exceed four.

The process according to the invention makes it possible to isolate from such mixtures of organosilanes the organochlorosilane for which $n$ has the lowest value. For example, the invention makes it possible to separate monochlorosilanes from their mixtures with dichlorosilanes, which may or may not contain trichlorosilanes. It also makes it possible to separate dichlorosilanes from their mixtures with trichlorosilanes. Thus the separation of the following mixtures may be obtained, for example, diphenylmethylchlorosilane and diphenyldichlorosilane; dimehylphenylchlorosilane, methylphenyldichlorosilane and phenyltrichlorosilane; (p-chlorophenyl)dimethylchlorosilane and (p-chlorophenyl)methyldichlorosilane; methylphenyldichlorosilane and phenyltrichlorosilane; methylvinyldichlorosilane and vinyltrichlorosilane; and ($\beta$-cyanoethyl)methyldichlorosilane and ($\beta$-cyanoethyl)trichlorosilane.

The invention also makes it possible to purify a mixture (A, B) consisting of organosilicon compounds of the general formula:

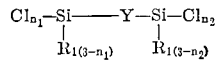

in which $R_1$ represents methyl or ethyl; $n_1$ represents zero or the integer 1 or 2; $n_2$ represents an integer from 1 to 3, such that $n_2 \geq n_1$; and Y represents a single bond between the silicon atoms or a divalent radical which may contain groups which are inert with respect to the compounds used for the purification.

More particularly, Y may represent a saturated or olefinically unsaturated divalent hydrocarbon radical which may be aliphatic, cycloaliphatic, aromatic or aralkyl, for example, substituted or unsubstituted polymethylene radicals containing 1 to 10 carbon atoms, cycloalkylene radicals containing 4 to 6 ring carbon atoms, or substituted or unsubstituted phenylene radicals. Y may also represent a divalent hydrocarbon radical interrupted by one or more hetero-atoms, for example oxygen, such as in the radicals derived from dimethyl ether, diethyl ether or diphenyl ether. Y may further represent a divalent radical consisting of a polysiloxane chain containing units of formula:

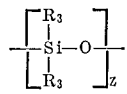

in which $R_3$ represents alkyl or alkenyl containing 1 to 6 carbon atoms or phenyl, and $z$ being a number which is preferably between 1 and 20; or a divalent radical consisting of a divalent atom, for example oxygen. Preferably Y represents a single bond.

The process according to the invention makes it possible to separate from such mixture (A, B) the compound (A) which has the smallest number of chlorine atoms bonded to the same silicon atom. Thus if the mixture contains organosilicon compounds possessing at least three chlorine atoms bonded to the same silicon atom and an organosilicon compound possessing at most two chlorine atoms bonded to the same silicon atom, the latter compound may be separated in the pure state. In the case of a mixture which contains organosilicon compounds possessing at least two chlorine atoms bonded to the same silicon atom and an organosilicon compound possessing at most one chlorine atom bonded to the same silicon atom, the latter compound may be separated in the pure state. For example, the separation of bis(dichloromethylsilyl)ethane from its mixture with bis(trichlorosilyl)ethane may thus be effected.

The component (a) which is added to the mixture of organosilicon compounds to be purified may be any one of a wide variety of compounds. In principle, this component may be any chemical compound which by reacting with the organochlorosilanes B is capable of forming a labile intermediate complex which can be decomposed by component (b) with regeneration of component (a). The components (a) are advantageously aprotic compounds. These are defined by B. Tchoubar, Bull. Soc. Chim. France, p. 2027 (1964) and by A. J. Parker [Quart. Rev., 16, 163 (1962)].

The following classes of compounds may be used as component (a): organic ethers such as diethyl ether, dioxane or tetrahydrofuran; aliphatic or cycloaliphatic ketones, such as acetone; aliphatic nitriles, such as acetonitrile; tertiary amines such as triethylamine; hexaalkylphosphotriamides, such as hexamethylphosphotriamide; dialkylformamides, such as dimethylformamide; pyrrolidones or N-alkylated pyrrolidones, such as N-methyl pyrrolidone; dialkylsulphoxides, such as dimethylsulphoxide; organosilyl phosphates; and organosilyl sulphates.

Component (a) may be directly added to the reaction mixture or may be produced in situ. For example, the addition of an aprotic compound precursor such as phosphoric acid or sulphuric acid to a mixture of chlorosilanes causes the formation of the aprotic compound such as the organosilyl phosphates or sulphates. A single component (a) or a mixture of several such components may be used.

The component (b) is of the general formula ROH, in which R preferably represents: hydrogen, straight-chain or branched alkyl containing 1 to 6 carbon atoms, cycloalkyl containing 4 to 6 ring carbon atoms, or a phenylalkyl in which the alkyl residue contains 1 to 6 carbon atoms.

For example, water, primary alcohols, such as n-propanol, n-butanol and n-pentanol, benzyl alcohol; secondary alcohols, such as cyclohexanol and isobutanol; and tertiary alcohols, such as tertiary butanol may be used as component (b).

A single component (b) or a mixture of such components may be used. It is, for example, possible to use a mixture of water and butanol though this mixture is two-phase.

The component (a) is used in a proportion of 0.0001 to 0.01 mol per organosilicon group having the largest number of chlorine atoms bonded to the same silicon atom. In practice, it is preferred to use component (a) in a proportion of 0.0005 to 0.005 mol per organosilicon group possessing the largest number of chlorine atoms bonded to the same silicon atom.

The component (b) is preferably used in an amount of 1 to 4 mols per organosilicon group possessing the largest number of chlorine atoms bonded to the same silicon atom. In practice, there is no advantage gained by using too great an excess of compound ROH because this would cause a reduction in the amount of compound A obtained.

The process of the present invention makes it possible to separate mixtures of organosilicon compounds in any proportions. However, the process is particularly well suited to mixtures containing more than 80% of the least chlorinated derivative A. The reaction may be carried out in the presence of organic solvents and for this purpose chlorinated or non-chlorinated hydrocarbons may be used, for example, benzene, cyclohexane or dichlorobenzene.

The purification process may be carried out at temperatures of between 0° and 150° C., temperatures between 20° and 100° C. being preferred.

A preferred embodiment of the process is effected as follows. Component (a) is first added to the mixture of chlorosilanes (A,B) which is to be purified, and component (b) is then run in gradually while keeping the temperature constant. (It is also possible to run the mixture of components (a) and (b) gradually into the mixture of organochlorosilanes). Thereafter the reaction mixture is fractionated, for example by distilling the compound A. By proceeding in this manner, the least chlorinated product is obtained in very good yield and in a purity which is markedly improved compared to that of the product obtained by distillation using the same column without the prior addition of an aprotic compound and of a compound ROH, or with the addition of the compound ROH alone. Using a suitable distillation column, the least chlorinated chlorosilane may be obtained completely pure.

The other chlorosilanes B, which have been converted into alkoxysilanes if component (b) was an alcohol, may be fractionated by distillation. Since they show a similar reactivity to that of the chlorosilanes in numerous reactions, they are still valuable products and may easily be utilised.

The following examples illustrate the invention.

EXAMPLE 1

500 g. of a mixture of chlorosilanes consisting of 95% of trimethylchlorosilane and 5% of dimethyldichlorosilane were heated to 50° C. 1.4 g. of tetrahydrofuran were then added, 30 g. of n-butanol were run in over 15 minutes, and the mixture was stirred for 1 hour at 50° C.

The reaction mixture was thereafter distilled under atmospheric pressure through a column filled with a packing of knitted stainless steel wire (height: 500 mm. diameter: 45 mm.). A fraction boiling at 57.6°–58.6° C. under 756 mm. Hg and weighing 447 g. was recovered. A residue of 55 g. remained. The fraction was analysed by chromatography and was found to consist of trimethylchlorosilane containing less than 0.1% of dimethyldichlorosilane. The purification yield was 94.8%.

EXAMPLE 2

Mixtures of trimethylchlorosilane and dimethyldichlorosilane in varying proportions were purified in accordance with Example 1, using different components (a) and (b). The results are given in Table I (in all cases the aprotic compound was run in instantaneously while the compound ROH was run in over the course of 30 minutes).

TABLE I

| Proportion of chlorosilanes, percent | Component (a) | Component (a), organo-chlorosilane,[1] percent | Component (b) | Component (b), chlorosilane,[1] (molar) | T.° C. of purification | Purity of product, percent | Yield of trimethylchlorosilane, percent |
|---|---|---|---|---|---|---|---|
| 95-5 [2] | H₃PO₄ | 0.05 | n-Butanol | 2.1 | 50 | 100 | 82.3 |
| 94.3-5.7 | do | 0.1 | Cyclohexanol | 2.1 | 40 | 100 | 91.2 |
| 95-5 | do | 0.1 | Tertiary butanol | 2.1 | 50 | 100 | 93.5 |
| 95-5 | Dioxane | 0.1 | n-Butanol | 2.1 | 50 | 100 | 94 |
| 95-5 | Dimethylsulphoxide | 0.1 | do | 2.1 | 50 | 100 | 90 |
| 95-5 | Tetrahydrofuran | 0.1 | do | 2.1 | 50 | 100 | 94.8 |
| 95-5 | (SiMe₃)₂SO₄ | 0.06 | do | 1.25 | 40 | 99.2 | 93.2 |
| 95-5 | (SiMe₃)₃PO₄ | 0.06 | do | 1.25 | 40 | 99.2 | 96.5 |
| 94-6 | Dimethylformamide | 0.1 | Water | 2.1 | 40 | 100 | 75.4 |
| 94-6 | do | 0.1 | Tertiary butanol | 2.1 | 40 | 100 | 92.6 |
| 94.3-5.7 | H₂SO₄ | 0.1 | n-Butanol | 2.1 | 40 | 100 | 91 |
| 95-5 | Triethylamine | 0.1 | do | 2.1 | 45 | 100 | 92 |
| 95-5 | Acetonitrile | 0.1 | do | 2.1 | 40 | 100 | 92.7 |
| 95-5 | Acetone | 0.1 | do | 2.1 | 40 | 99.6 | 84 |

[1] The chlorosilanes involved in these ratios are those which are converted into alkoxysilanes or into siloxanes.
[2] The first figure corresponds to the trimethylchlorosilane.

EXAMPLE 3

A mixture of methylphenyldichlorosilane and phenyltrichlorosilane in various proportions was purified according to Example 1, using various components (a) and (b). The results are given in Table II.

EXAMPLE 4

The starting mixture (A,B) contained 94.1% of methyldiphenylchlorosilane and 5.9% of diphenyldichlorosilane. The purification was carried out as in Example 1 at 100° C. using phosphoric acid (molar ratio phosphoric acid/chlorosilane: 0.05) and n-butanol (molar ratio butanol/chlorosilane: 2.1). The methyldiphenylchlorosilane obtained after distillation in a yield of 86.6% was of 98.6% strength.

EXAMPLE 5

A mixture consisting of methylvinyldichlorosilane and vinyltrichlorosilane in the ratio of 95%–5% was purified using various components (a) and (b). The results are given in Table III.

TABLE III

| Component (a) | Component (a), organochlorosilane,[1] percent | Component (b) | Component (b), chlorosilane,[1] (molar) | T.° C. of purification | Purity of the product, percent | Yield of methylvinyldichlorosilanes, percent |
|---|---|---|---|---|---|---|
| N-methylpyrrolidone | 0.1 | Cyclo-hexanol | 2.1 | 55 | 99.4 | 91 |
| Dimethylformamide | 0.1 | Benzyl-alcohol | 2.1 | 50 | 99.4 | 93 |
| H₃PO₄ | 0.1 | Tertiary butanol | 2.1 | 50 | 99.9 | 88.3 |

[1] The chlorosilanes involved in these ratios are those which are converted into alkoxysilanes.

EXAMPLE 6

37.2 g. of 85% strength phosphoric acid were added at 100° C. to a mixture weighing 7443 g. and consisting of:

| | Percent |
|---|---|
| Diphenylmethylchlorosilane | 85.7 |
| Diphenyldichlorosilane | 10.9 |
| Methylphenyldichlorosilane | 2.0 |
| Dimethylphenylchlorosilane | 1.4 | and 503 g. of n-butanol were run in over the course of 30 minutes. After distillation, a fraction boiling at 126°–130° C. at 1.2 mm. Hg, weighing 5705 g. and containing 99.1% of diphenylmethylchlorosilane was recovered. The purification yield was 88.8%.

TABLE II

| Proportion of chlorosilanes, percent | Component (a) | Component (a), organochlorosilane,[1] percent | Component (b) | Component (b) chlorosilane,[1] (molar) | T.° C. of purification | Purity of product, percent | Yield of methylphenyl dichlorosilanes, percent |
|---|---|---|---|---|---|---|---|
| 95-5 | H₃PO₄ | 0.1 | n-Butanol | 2.2 | 100 | 99.8 | 84 |
| 47.5-52.5 | do | 0.1 | do | 1.5 | 100 | 98 | 71.2 |
| 95-5 | (SiMe₃)₃PO₄ | 0.1 | do | 2.1 | 25-30 | 99.8 | 94.5 |
| 97.8-2.2 | do | 0.05 | do | 2.1 | 100 | >99 | 95 |
| 95.1-4.9 | Hexamethylphosphotriamide | 0.01 | do | 2 | 100 | 98.4 | 93.3 |
| 95-5 | Nil | 0 | do | 1 | 100 | 95.2 | 90 |
| 95-5 | Nil | 0 | do | 3 | 100 | 96.5 | |

[1] The chlorosilanes involved in these ratios are those converted into alkoxysilanes.

NOTE.—The last two experiments of the table show that an alcohol alone cannot ensure purification.

EXAMPLE 7

900 g. of a mixture of the following composition were purified:

| | Percent |
|---|---|
| Dimethylphenylchlorosilane | 89 |
| Methylphenyldichlorosilane | 7.8 |
| Phenyltrichlorosilane | 1.7 |
| More volatile chlorosilane | 1.5 |

5 g. of 85% phosphoric acid and 67 g. of n-butanol were run in at 100° C. After distillation, a fraction boiling at 83.8° C. at 15 mm. Hg, weighing 683 g. and containing 99.5% of dimethylphenylchlorosilane was obtained. The purification yield was 84.5%.

EXAMPLE 8

205 g. of a mixture containing:

| | Percent |
|---|---|
| p-Chlorophenyldimethylchlorosilane | 93.9 |
| p-Chlorophenylmethyldichlorosilane | 6.1 | were purified. 0.6 g. of phosphoric acid and 8.3 g. of n-butanol were run in at 100° C. The addition lasted 5 minutes, stirring and heating being continued for 1 hour. A fraction boiling at 106°–112° C., at 16 mm. Hg, weighing 142.5 g. and containing 100% of p-chlorophenyl-dimethylchlorosilane was collected by distillation. The purification yield was 76%.

EXAMPLE 9

243 g. of a mixture containing:

| | Percent |
|---|---|
| 1,2-bis(methyldichlorosilyl)ethane | 95 |
| 1,2-bis(trichlorosilyl)ethane | 5 | was purified. 0.5 g. of phosphoric acid wae added at 100° C., and 6.4 g. of n-butanol were run in over the course of 3 minutes, heating and stirring being continued for 1 hour. After distillation, a fraction boiling at 90.1°–91.2° C., at 14 mm. Hg, weighing 218.5 g. and containing 98.6% of 1,2-bis(methyldichlorosilyl)ethane was recovered. The purification yield was 93.4%.

EXAMPLE 10

203 g. of a mixture of the following composition were purified.

| | Percent |
|---|---|
| (β-Cyanoethyl)methyldichlorosilane | 95 |
| (β-Cyanoethyl)trichlorosilane | 5 |

0.6 g. of phosphoric acid and 8.1 g. of n-butanol were run in at 100° C. over the course of 5 minutes. Stirring was continued for 1 hour. After distillation, a fraction boiling at 98°–103° C., at 15 mm. Hg, weighing 175 g. and containing 99.7% of (β-cyanoethyl)methyldichlorosilane was recovered. The purification yield was 90.5%.

We claim:

1. A process for the purification of a mixture of organo-silicon compounds containing at least one chlorinated organosilicon compound which comprises (1) adding to the mixture, together or successively; (a) an aprotic compound or precursor thereof and (b) a compound ROH wherein R represents hydrogen, alkyl, cycloalkyl or aralkyl, the component (a) being used in a proportion of 0.0001 to 0.01 mol per organosilicon group possessing the largest number of chlorine atoms bonded to the same silicon atom, and the component (b) being used in an amount of at least one mol per organosilicon group possessing the largest number of chlorine atoms bonded to the same silicon atom, and (2) isolating by fractional distillation the organosilicon derivative containing the smallest number of chlorine atoms bonded to the same silicon atom, it being possible for this number to be zero.

2. The process according to claim 1 in which the mixture of organosilicon compounds consist of organosilanes of the formula:

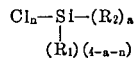

in which $R_1$ represents methyl or ethyl; $R_2$ represents alkyl or alkenyl containing 1 to 6 carbon atoms, cycloalkyl or cycloalkenyl containing 4 to 6 ring carbon atoms, aryl, aralkyl or alkaryl, which radical may also contain groups which are inert with respect to compounds used for the purification, $a$ represents zero or an integer from 1 to 3; and $n$ represents zero or an integer from 1 to 4 and the sum $(a+n)$ does not exceed four.

3. The process according to claim 1 in which the mixture of organosilicon compounds consists of compounds of the formula:

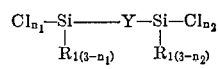

in which $R_1$ represents methyl or ethyl; $n_1$ represents zero or the integer 1 or 2; $n_2$ represents an integer from 1 to 3 such that $n_2 \geq n_1$; and Y represents a single bond between the silicon atoms or a divalent radical which may contain groups which are inert with respect to the compounds used for the purification.

4. The process according to claim 3 in which the mixture of organosilicon compounds consists of compounds of the formula:

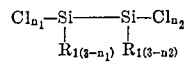

in which $R_1$ represents methyl or ethyl; $n_1$ represents zero or the integer 1 or 2; and $n_2$ is an integer from 1 to 3 such that $n_2 \geq n_1$.

5. The process according to claim 1 in which the aprotic compound is dioxane, tetrahydrofuran, isopropyl ether, acetone, acetonitrile, triethylamine, dimethylformamide, dimethylsulphoxide, hexamethylphosphotriamide, N-methylpyrrolidone, trimethylsilyl phosphate and trimethylsilyl sulphate.

6. The process according to claim 5 in which the organosilyl phosphate is formed in situ by addition of phosphoric acid to the mixture of organosilicon compounds.

7. The process according to claim 5 in which the organosilyl sulphate is formed in situ by addition of sulphuric acid to the mixture of organosilicon compounds.

References Cited

UNITED STATES PATENTS

| | | | |
|---|---|---|---|
| 3,359,186 | 12/1967 | Petelinkar | 260—448.2 E X |
| 3,414,603 | 12/1968 | McAvsky | 260—448.2 E |
| 3,428,530 | 2/1969 | Fauche et al. | 260—448.2 E X |
| 3,440,264 | 4/1969 | McVannel | 260—448.2 E |
| 3,441,584 | 4/1969 | Bazouin et al. | 260—448.2 E |

TOBIAS E. LEVOW, Primary Examiner

P. F. SHAVER, Assistant Examiner

U.S. Cl. X.R.

203—38; 260—448.8 R